United States Patent
Iwami et al.

(10) Patent No.: US 7,421,336 B2
(45) Date of Patent: Sep. 2, 2008

(54) AUTOMOBILE NAVIGATION DEVICE WITH GUIDANCE

(75) Inventors: Ryotaro Iwami, Kobe (JP); Nobuyuki Nakano, Toyonaka (JP); Tomohiro Terada, Ibaraki (JP); Takeshi Takahashi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 247 days.

(21) Appl. No.: 10/559,436

(22) PCT Filed: Aug. 16, 2004

(86) PCT No.: PCT/JP2004/012030

§ 371 (c)(1),
(2), (4) Date: Dec. 5, 2005

(87) PCT Pub. No.: WO2005/017453

PCT Pub. Date: Feb. 24, 2005

(65) Prior Publication Data

US 2007/0106458 A1 May 10, 2007

(30) Foreign Application Priority Data

Aug. 18, 2003 (JP) ............................. 2003-294480

(51) Int. Cl.
*G01C 21/00* (2006.01)

(52) U.S. Cl. .................. 701/201; 701/200; 701/25; 340/995.23; 340/988; 73/178

(58) Field of Classification Search ......... 701/200–201, 701/25; 340/995.23, 988; 709/207; 707/E17.032, 707/3, E17.109; 73/178; 116/1
See application file for complete search history.

(56) References Cited

U.S. PATENT DOCUMENTS 3,108,182 A * 10/1963 Gray et al. ............... 235/401

(Continued)

FOREIGN PATENT DOCUMENTS

JP 3-75997 3/1991

(Continued)

OTHER PUBLICATIONS

Automobile navigation system using individual communication beacon; Kanemitsu, H.; Saito, T.; Shima, J.; Tanaka, Y.; Vehicle Navigation and Information Systems Conference, 1991; vol. 2, Oct. 20-23, 1991 pp. 241-245.*

(Continued)

*Primary Examiner*—Cuong H Nguyen
(74) *Attorney, Agent, or Firm*—Wenderoth, Lind & Ponack, L.L.P.

(57) ABSTRACT

A navigation device decreasing the frequency at which a user data stored in a data storage section, the navigation device includes a route receiving section for receiving route data, a data selecting section for selecting candidate location data indicating at least one location which exists on the route represented by the route data or in a vicinity of the route, and a location-change designating section for designating a location of change at which a guiding method is to be changed. Further, the navigation device includes a determination section for determining whether a user has arrived at the location of change, and a navigation guidance section for guiding the user to the destination with a relatively detailed method when the determination section determines that the user has arrived at the location of change.

8 Claims, 19 Drawing Sheets

U.S. PATENT DOCUMENTS

| | | | |
|---|---|---|---|
| 3,786,505 A * | 1/1974 | Rennie | 342/33 |
| 4,943,925 A * | 7/1990 | Moroto et al. | 701/211 |
| 5,568,390 A * | 10/1996 | Hirota et al. | 701/201 |
| 5,654,908 A * | 8/1997 | Yokoyama | 708/109 |
| 5,957,995 A * | 9/1999 | Beckmann et al. | 701/213 |
| 6,038,507 A * | 3/2000 | Miyano | 701/202 |
| 6,070,122 A * | 5/2000 | Ishida et al. | 701/208 |
| 6,163,753 A * | 12/2000 | Beckmann et al. | 701/213 |
| 6,249,214 B1 * | 6/2001 | Kashiwazaki | 340/425.5 |
| 6,484,090 B1 * | 11/2002 | Lahaije et al. | 701/208 |
| 6,505,120 B2 * | 1/2003 | Yamashita et al. | 701/211 |
| 6,567,743 B1 * | 5/2003 | Mueller et al. | 701/209 |
| 6,606,559 B1 * | 8/2003 | Beckmann et al. | 701/213 |
| 6,748,325 B1 * | 6/2004 | Fujisaki | 701/301 |
| 6,753,902 B1 * | 6/2004 | Kashiwazaki | 348/119 |
| 6,901,331 B1 * | 5/2005 | Beckmann et al. | 701/213 |
| 6,950,100 B2 * | 9/2005 | Yamada et al. | 345/428 |
| 2002/0165668 A1 * | 11/2002 | Yamashita et al. | 701/211 |

FOREIGN PATENT DOCUMENTS

| | | | |
|---|---|---|---|
| JP | 10089983 A * | 4/1998 | |
| JP | 10-293036 | 11/1998 | |
| JP | 11-201767 | 7/1999 | |
| JP | 2002-236028 | 8/2002 | |
| JP | 2003-57059 | 2/2003 | |
| JP | 2005069783 A * | 3/2005 | |
| JP | 2007212437 A * | 8/2007 | |

OTHER PUBLICATIONS

Land-vehicle navigation using GPS; Abbott, E.; Powell, D.; Proceedings of the IEEE; vol. 87, Issue 1, Jan. 1999 pp. 145-162; Digital Object Identifier 10.1109/5.736347.*

Maritime satellite requirements and utilization; LaRosa, R.M.; Vehicular Technology, IEEE Transactions on☐☐vol. 26, Issue 3, Aug. 1977 pp. 251-257.*

Evaluation of GA-based dynamic route guidance for car navigation using cellular automata; Kanoh, H.; Kozuka, H.; Intelligent Vehicle Symposium, 2002. IEEE; vol. 1, Jun. 17-21, 2002 pp. 178-183 vol. 1; Digital Object Identifier 10.1109/IVS.2002.1187948.*

M. Kakihara and M. Sasaki, Vehicle navigation apparatus employing node selection, comparison and elimination techniques, U.S. Patent 5 109 344, Apr. 1992.*

Showing Users the Way: Signs in Virtual Worlds; Cliburn, D.C.; Rilea, S.L.; Virtual Reality Conference, 2008. VR '08. IEEE Mar. 8-12, 2008 pp. 129-132; Digital Object Identifier 10.1109/VR.2008.4480763.*

ICNavS: a tool for reliable dynamic route guidance; Kaparias, I.; Bell, M.G.H.; Chen, Y.; Bogenberger, K.; Intelligent Transport Systems, IET; vol. 1, Issue 4, Dec. 2007 pp. 225-233; Digital Object Identifier 10.1049/iet-its:20060066.*

Park, K., Bell, M.G.H., Kaparias, I., and Bogenberger, K.: 'Learning user preferences of route choice behaviour for adaptive route guidance', IET Intell. Transp. Syst., 2007, 1, (2), pp. 159-166.*

Park, K., Bell, M.G.H., Kaparias, I., and Bogenberger, K.: 'Adaptive route choice model for intelligent route guidance'. TRB 2007 Annual Meeting CD-ROM, Washington, DC, USA, 2007.*

Chen, Y., Kaparias, I., Bell, M.G.H., and Bogenberger, K.: 'Reliable autonomous route guidance by a constrained A_ search considering intersection delays', The Reliability of Traveling and the Robustness of Transport Systems, (Delft, The Netherlands, 2005).*

Chen, Y., Bell, M.G.H., Wang, D., and Bogenberger, K.: 'Risk-averse time-dependent route guidance by constrained dynamic A_ search in decentralized system architecture', Transp. Res. Record, 2006, 1944, pp. 51-57.*

Bates, J., Black, I., Fearon, J., Gilliam, C., and Porter, S.: 'Supply models for use in modelling the variability of journey times on the highway network'. AET—Proc. European Transport Conf. 2002, Cambridge, UK, 2002.*

* cited by examiner

F I G. 1
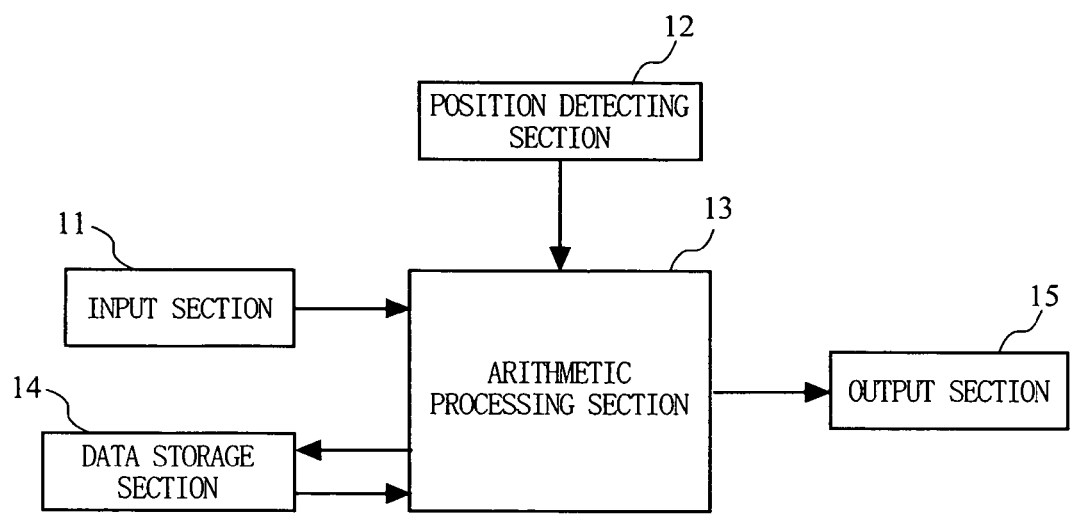

F I G. 5
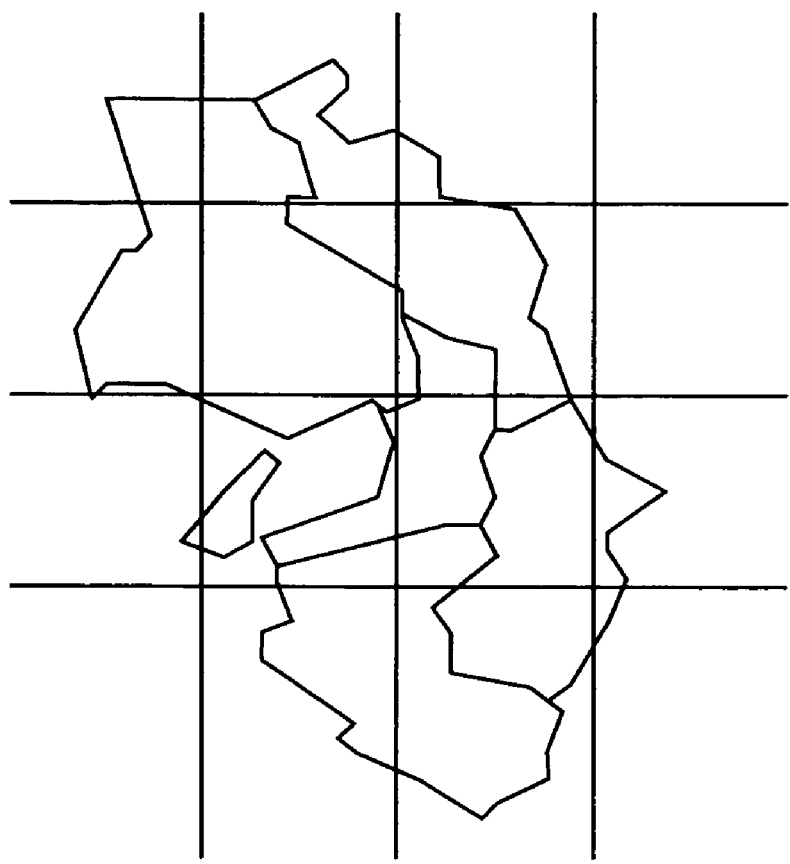

F I G. 6
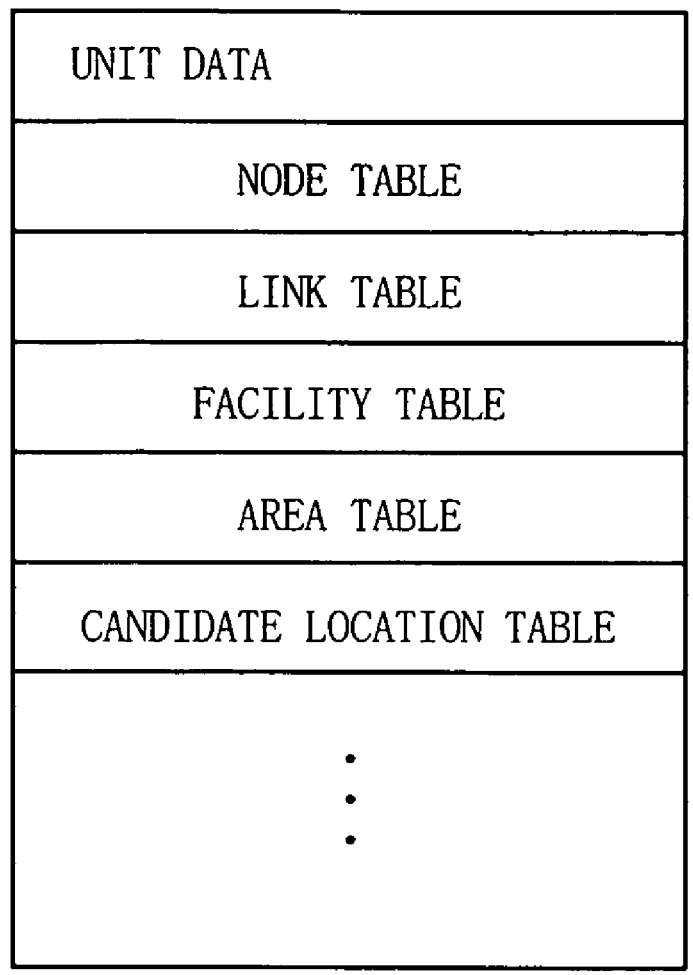

FIG. 7

| NODE TABLE | | | |
|---|---|---|---|
| NODE NUMBER | COORDINATES | CONNECTING LINK NUMBER | NAME |
| N1 | x1, y1 | L1, L3, L5 | ○○ INTERSECTION |
| N2 | x2, y2 | L1, L2 | △△ INTERSECTION |
| N3 | x3, y3 | L2, L4, L8 | ×× INTERSECTION |
| N4 | x4, y4 | L3, L6, L19 | ▲▲ INTERSECTION |
| N5 | x5, y5 | L6, L7 | □□ HIGHWAY, ○○ INTERCHANGE |
| ⋮ | ⋮ | ⋮ | ⋮ |

F I G. 8

| LINK TABLE | | | | |
|---|---|---|---|---|
| LINK NUMBER | START END NODE NUMBER | TERMINAL END NODE NUMBER | LINK LENGTH | FACILITY/ AREA NUMBER |
| L1 | N1 | N2 | 100 | T1 , T2 |
| L2 | N2 | N3 | 125 | T3 |
| L3 | N1 | N4 | 56 | T4 |
| L4 | N3 | N7 | 120 | — |
| L5 | N1 | N6 | 30 | T5 , T6 , E3 |
| ⋮ | ⋮ | ⋮ | ⋮ | ⋮ |

FIG. 9

| FACILITY TABLE | | | |
|---|---|---|---|
| FACILITY NUMBER | COORDINATES | CATEGORY INFORMATION | NAME |
| T1 | x1, y1 | U1 | ○○ CITY HALL |
| T2 | x2, y2 | U2 | ○○ POST OFFICE |
| T3 | x3, y3 | U3 | ○○ ELEMENTALLY SCHOOL |
| T4 | x4, y4 | U3 | △△ ELEMENTALLY SCHOOL |
| T5 | x5, y5 | U3 | ×× ELEMENTALLY SCHOOL |
| ⋮ | ⋮ | ⋮ | ⋮ |

F I G. 1 0

| AREA TABLE | | | |
|---|---|---|---|
| AREA NUMBER | REGION INFORMATION | SIZE INFORMATION | NAME |
| E1 | XY1, XY2, XY3, ⋯, XY12 | V1 | ○○○ |
| E2 | XY13, XY14, ⋯, XY22 | V1 | ××× |
| E3 | XY23, XY24, ⋯, XY28 | V2 | △△△ |
| ⋮ | ⋮ | ⋮ | ⋮ |

FIG. 11

| ROUTE DATA |
|---|
| LINK NUMBER |
| L3 |
| L6 |
| L7 |
| L107 |
| L109 |
| ⋮ |

F I G. 1 9

| CANDIDATE LOCATION TABLE |
|---|
| U1 , U2 , U3 , U5 , U9 , V1 , V2 , V4 |

AUTOMOBILE NAVIGATION DEVICE WITH GUIDANCE

BACKGROUND OF THE INVENTION

1. Field of the Invention

The present invention relates to a navigation device, and more particularly, to a navigation device in which a guiding system is switched before and after arriving at a particular location on a route.

2. Background of the Related Art

A well-known navigation device searches, when a user sets a destination, a route from a current position to the destination and guides the user to the destination along the searched route. During such guidance, the navigation device provides the user with a uniform and detailed guidance in accordance with a predetermined rule. For example, before arriving at each intersection on the route, the navigation device guides the user by voice as to the direction which he or she should take, or informs the user by voice of a characteristic object (e.g., a landmark) that is in the vicinity of the intersection.

However, the user is often familiar with a road condition for a portion (e.g., an area around the user's home) of an entire route. Yet, once a route is searched, the navigation device provides a uniform and detailed guidance even for an area in which the user is familiar with its road condition. Therefore, there is a problem that the user may feel troublesome from the guidance provided for the area.

In order to solve the above problem, a conventional navigation device once displays a map showing an entire route from a starting point to a destination (hereinafter, referred to as an entire map). As such, the user drives a vehicle as referring to the entire map, and operates an input device when a detailed guidance is needed. Thus, a guidance starting point is set in the conventional navigation device, and according to the guidance starting point, the conventional navigation device searches a route from the guidance starting point to the destination. Thereafter, the conventional navigation device guides the user from the guidance starting point to the destination in accordance with the currently searched route.

BRIEF DESCRIPTION OF THE INVENTION

As described above, in the conventional navigation device, the entire map continues to be displayed until the guidance starting point is set. During the period, there is a problem that the user is likely to look frequently at a display device so as to confirm where the current position is on the route, which increases the frequency at which the user directs his or her attention to the navigation device.

Therefore, an object of the present invention is to provide a navigation device capable of decreasing the frequency at which a user directs his or her attention to the navigation device.

In order to attain the object described above, a first aspect of the present invention is directed to a navigation device comprising: a data storage section for storing map data; a destination designating section for designating a destination; a position deriving section for deriving a current position of a user; a route receiving section for receiving route data representing a route from the current position derived by the position deriving section to the destination designated by the destination designating section, by means of the map data stored in the data storage section; a data selecting section for selecting candidate location data indicating at least one location which exists on the route represented by the route data or in a vicinity of the route, and satisfies a predetermined condition, based on the route data received by the route receiving section and the map data stored in the data storage section; a location-change designating section for designating a location of change at which a guiding method is to be changed, based on the candidate location data selected by the data selecting section; a determination section for determining whether the user has reached the location of change, based on the current position derived by the position deriving section and the location of change designated by the location-change designating section; and a navigation guidance section for guiding the user to the destination with a relatively detailed method, when the determination section determines that the user has arrived at the location of change. The location-change designating section includes a priority assigning section for assigning a priority to the location indicated by the candidate location data selected by the data selecting section, an output section for outputting a location indicated by the candidate location data selected by the data selecting section, and a location-change selecting section for selecting one location of change based on a designation from the user.

The data selecting section selects, on the route represented by the route data, candidate location data indicating at least one location existing within a range having a predetermined distance extending from the current position derived by the position deriving section in the direction of the destination designated by the destination designating section.

When the determination section determines that the user has arrived at the location of change, the navigation guidance section automatically changes a guiding method to a relatively detailed method.

The navigation guidance section guides the user to the destination by voice.

The navigation guidance section performs no process of the navigation guidance while the determination section determines that the user has not yet arrived at the location of change.

The data selecting section selects the candidate location data immediately after the route section generates the route data.

A second aspect of the present invention is directed to a guiding method executed by a navigation device, the method comprising: a destination designating step of designating a destination; a position deriving step of deriving a current position of a user; a route receiving step of receiving route data representing a route from the current position derived by the position deriving step to the destination designated by the destination designating step, by means of map data stored in the navigation device; a data selecting step of selecting candidate location data indicating at least one location which exists on the route represented by the route data or in a vicinity of the route, and satisfies a predetermined condition, based on the route data received by the route receiving step and the map data stored in the navigation device; a location-change designating step of designating a location of change at which a guiding method is to be changed, based on the candidate location data selected by the data selecting step; a determination step of determining whether the user has reached the location of change, based on the current position derived by the position deriving step and the location of change designated by the location-change designating step; and a navigation guidance step of guiding the user to the destination with a relatively detailed method when the determination step determines that the user has arrived at the location of change. The location-change designating step includes a priority assigning step for assigning a priority to the location indicated by the candidate location data selected by the data selecting step, an output step for outputting a location indicated by the candidate location data selected by the data selecting step, and a location-change selecting step for selecting one location of change based on a designation from the user.

A third aspect of the present invention is directed to a computer program to be executed by a navigation device for guiding a user to a destination, the computer program comprising: a destination designating step of designating a destination; a position deriving step of deriving a current position of a user; a route receiving step of receiving route data representing a route from the current position derived by the position deriving step to the destination designated by the destination designating step, by means of map data stored in the navigation device; a data selecting step of selecting candidate location data indicating at least one location which exists on the route represented by the route data or in a vicinity of the route and satisfies a predetermined condition, based on the route data received by the route receiving step and the map data stored in the navigation device; a location-change designating step of designating a location of change at which a guiding method is to be change, based on the candidate location data selected by the data selecting step; a determination step of determining whether the user has reached the location of change, based on the current position derived by the position deriving step and the location of change designated by the location-change designating step; and a navigation guidance step of guiding the user to the destination with a relatively detailed method when the determination step determines that the user has arrived at the location of change. The location-change designating step includes a priority assigning step for assigning a priority to the location indicated by the candidate location data selected by the data selecting step, an output step for outputting a location indicated by the candidate location data selected by the data selecting step, and a location-change selecting step for selecting one location of change based on a designation from the user.

The computer program is recorded on a storage medium.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating a configuration of a navigation device according to an embodiment of the present invention;

FIG. 5 is a schematic diagram illustrating an exemplary map image displayed by map data which is stored in a data storage section 14 shown in FIG. 1;

FIG. 6 is a schematic diagram illustrating an exemplary outline structure of the map data stored in the data storage section 14 shown in FIG. 1;

FIG. 7 is a schematic diagram illustrating an exemplary configuration of a node table shown in FIG. 6;

FIG. 8 is a schematic diagram illustrating an exemplary configuration of a link table shown in FIG. 6;

FIG. 9 is a schematic diagram illustrating an exemplary configuration of a facility table shown in FIG. 6;

FIG. 10 is a schematic diagram illustrating an exemplary configuration of an area table shown in FIG. 6;

FIG. 11 is a schematic diagram illustrating an exemplary structure of route data received in step S102 shown in FIG. 2;

FIG. 6 is a flowchart illustrating a detailed procedure of step S302 shown in FIG. 4;

FIG. 19 is a schematic diagram illustrating an exemplary configuration of a candidate location table shown in FIG. 6.

DETAILED DESCRIPTION OF THE INVENTION

Figure 2:
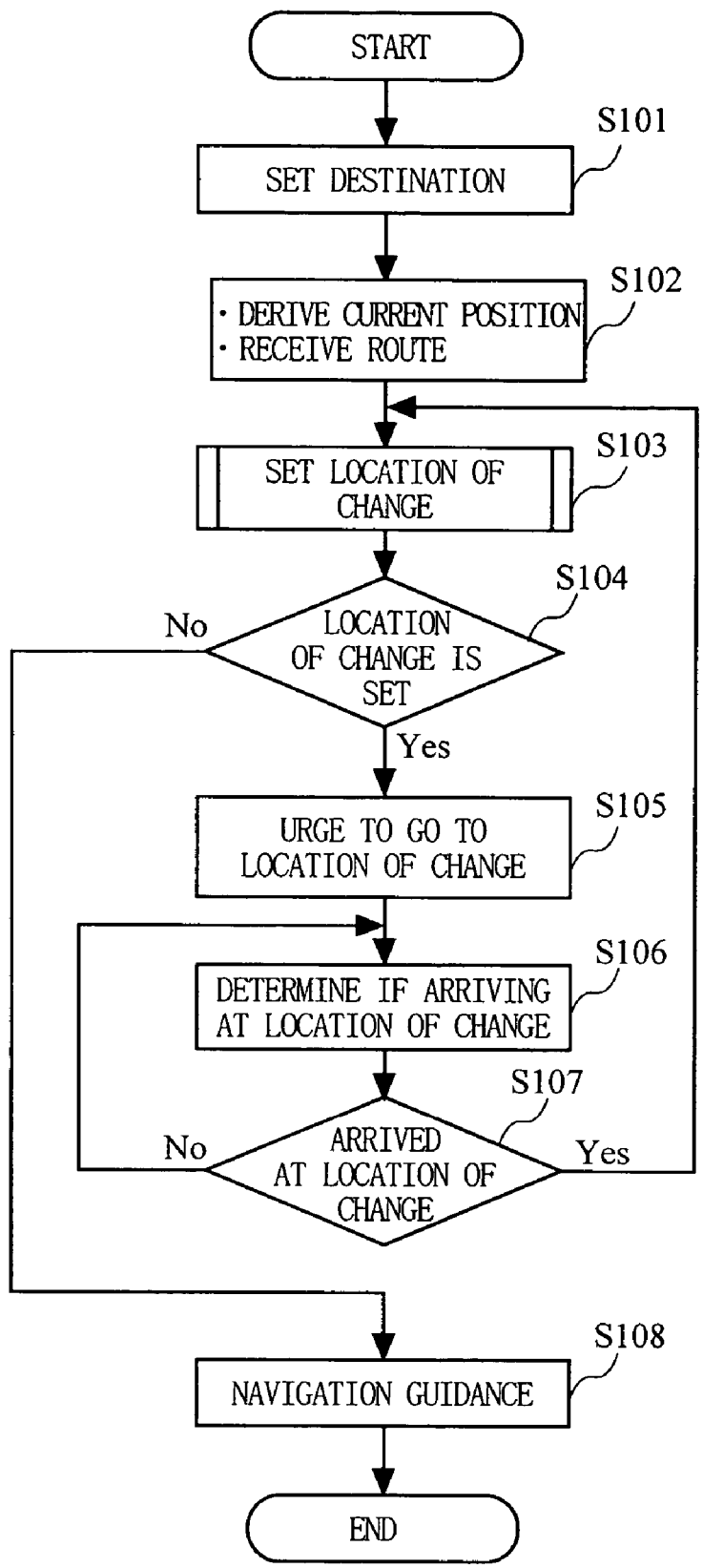
FIG. 2 is a flowchart illustrating an entire process of the navigation device shown in FIG. 1.

Hereinafter, the present invention is described with reference to the drawings.

FIG. 1 is a diagram illustrating a configuration of a navigation device according to an embodiment of the present invention. In FIG. 1, the navigation device is mostly mounted on a vehicle, and guides a user to a destination. For such a guidance process, the navigation device includes an input section 11, a position detecting section 12, an arithmetic processing section 13, a data storage section 14, and an output section 15.

The input section 11 is, for example, a dedicated remote control for the user to operate the navigation device, a microphone for collecting the user's voice, or a cellular phone or a PDA (Personal Digital Assistant) having an IrDA (infrared communication) function. By operating such an input section 11, the user inputs various information, such as setting a destination, to the navigation device. In response to the user's operation, the input section 11 sends predetermined information to the arithmetic processing section 13.

The position detecting section 12 typically includes a combination of a speed sensor and a gyro sensor, and a GPS receiver. The speed sensor detects the speed of the vehicle installed with the navigation device, and the gyro sensor detects the moving direction of the vehicle. The GPS receiver detects the absolute position on the earth for the vehicle based on information sent from a GPS (Global Positioning System) satellite. The detected results from the sensors and the receiver are sent to the arithmetic processing section 13.

The arithmetic processing section 13 performs a well-known process, such as a route search, a navigation guidance and a map matching. The route search is a process of searching for a route from a current position of the vehicle to a destination set through the input section 11. The navigation guidance provides a guidance for intersections or cross roads on the route for the vehicle being driven along the searched route. The map matching corrects the information detected by the position detecting section 12 to a position on a road of a map, and derives the current position of the vehicle. Furthermore, the arithmetic processing section 13 performs a process of switching a guiding method as a unique process of the present embodiment. Such a switching process is described later in detail.

The data storage section 14 includes, for example, a CD-ROM, a DVD-ROM, an HDD (Hard Disk Drive), or a memory. In the data storage section 14, through not shown in FIG. 1, map data is stored, and such map data is used for a process by the arithmetic processing section 13. A configuration of the map data is described later in detail with reference to the drawings.

The output section 15 typically includes a speaker which outputs a voice guidance generated from a process of the navigation guidance by the arithmetic processing section 13. Although the present embodiment illustrates an example where the output section 15 includes no display device in order to prevent the user from looking at a display device, the present invention is not limited thereto. The output section 15 may include a display device.

Next, a process of the navigation device having the above configuration is described with reference to FIGS. 2 to 19.

First, referring to a flowchart shown in FIG. 2, an entire process of the navigation device is described. In FIG. 2, the arithmetic processing section 13 sets a destination which a user designates to head toward (step S101). Note that a well-known technique may be used for setting a destination. For example, there is a method in which the user operates the input section 11 to input addresses and/or zip codes, or telephone numbers, and then the arithmetic processing section 13 sets the destination by searching the destination through map data, using the inputted information as a search key. Alternatively, in a case where the output section 15 includes a display device, there is another method in which the user operates the input section 11 to directly designate the destination on a map displayed by the display device, and then the arithmetic processing section 13 sets the designated location as the destination.

Next, the arithmetic processing section 13 initially receives an output value from the position detecting section 12, performs the aforementioned map matching to the received value, and derives a current position of the user. Then, the arithmetic processing section 13 receives a route from the derived current position to the destination (step S102). Specifically, the arithmetic processing section 13 typically receives a route by using well-known algorithms such as Dijkstra method or A* method. In a route search, depending on an instruction from the user such as "general road priority" or "highway priority", a recommended route according to the instruction may be calculated, or a plurality of routes may be simultaneously searched so as to allow the user to select one of the routes. Additionally, in order to receive a route, without executing the algorithms described above, the arithmetic processing section 13 accesses a remote server by means of a communication module such as a cellular phone, and sends information of the derived current position and the destination to the server. The server searches for a route from the received current position to the destination and returns the route to the navigation device. As described above, the arithmetic processing section 13 may receive a route.

Then, by using the currently received route and the map data stored in the data storage section 14, the arithmetic processing section 13 performs a process of setting a location of change at which a guiding method is to be switched (step S103). the details of the process performed in step S103 are described later. A location of change is a location which exists on the currently received route or in the vicinity of the route, and satisfies a condition to be described later. Examples of such locations of change are characteristic points on the currently received route, and facilities existing in the vicinity of the route. Here, typical examples of the characteristic points are highway interchanges or intersections on the street. Also, the definition of the facilities includes target objects on land (landmarks) such as mountains, rivers, lakes, or large buildings. Other typical examples of the facilities include relatively small premises such as city halls, post offices, banks, department stores, super markets, restaurants, convenience stores, or railroad stations. Note that each characteristic point or facility as the location of change needs to be uniquely specified by the arithmetic processing section 13, for example, by providing a name such as "∞ school," "∆∆ bank, □ branch, or "xx station."

The location of change may not be limited to the above-described locations. The location of change may be a relatively wide range of area which, for example, specifies a location name. Furthermore, a range of area is not particularly defined. In other words, for example, it may be a narrow range of area in the vicinity in front of a railroad station, or a wide range of area divided based on an administrative district such as cities, towns or villages.

As a result of performing step S103, if the location of change is not set ("NO" in step S104), the arithmetic processing section 13 performs the process of the detailed navigation guidance in a conventional manner (step S108). Specifically, the navigation device guides the user by voice as to which direction to take for every intersection.

On the other hand, as a result of performing step S103, if the location of change is set ("YES" in step S104), the arithmetic processing section 13, as an additional process, generates voice data for telling the user by voice to drive freely to the location of change which has been set, and sends the voice data to the output section 15. In accordance with the received voice data, the output section 15 outputs a voice indicating that, for example, "please go to ∞ (a name of the location of change) for the moment" (step S105). The user drives the vehicle to the location of change according to such a voice.

Next, the arithmetic processing section 13 performs a process of determining whether or not the user has reached the location of change at predetermined intervals (step S106). Specifically, the arithmetic processing section 13 derives the user's current position in a similar manner described above. Then, when a remaining distance between the current position and the location of change reaches a predetermined threshold value, the arithmetic processing section 13 determines that the user has arrived at the location of change. Here, it is preferable that the predetermined threshold value be slightly over 0 rather than exactly 0 so as to allow a temporal margin, thereby enabling a smooth transition to step S108.

As a result of performing step S106, if it is determined that the user has not yet arrived at the location of change ("NO" in step S107), the arithmetic processing section 13 performs step S106 again.

On the other hand, as a result of performing step S106, if it is determined that the user has arrived at the location of change ("YES" in step S107), step S103 is performed since the user may set a next location of change.

If the location of change is not set in step S103 as described above, the arithmetic processing section 13 proceeds to step S108 and performs the process of the navigation guidance as described above. In such a process of the navigation guidance, the arithmetic processing section 13 ends the process shown in FIG. 2 when the user has arrived at the destination.

As described above, although the arithmetic processing section 13 receives, in step S102, the route from the current position derived in step S102 to the destination set in step S101, the arithmetic processing section 13 performs no process of the navigation guidance in step S108 until the user reaches the location of change. Therefore, the user can avoid, on the route, a troublesome navigation guidance provided by the navigation device until reaching a location at which he or she is confident to arrive without any support of the navigation device (e.g., a well-known location, or an interchange of highways or charged roads).

Note that when step S103 (a setting process of a location of change) is initially executed, step S103 is performed at a fixed timing immediately after the route has been received in step S102. Thus, the user can easily understand a timing when step S103 is initially performed. Furthermore, after the first location of change is set, the user has no need to direct his or her attention to the navigation device until reaching the destination or setting a next location of change. Therefore, it becomes possible to provide a navigation device allowing the user to concentrate more on driving a vehicle than in the conventional art.

In the above embodiment, the arithmetic processing section 13 derives the current position by map matching in step S102, which, however, is an auxiliary process. Alternatively, a route receiving process may be performed by using an output value (an output from a GPS receiver) received from the position detecting section 12.

In the above embodiment, the arithmetic processing section 13 performs step S103 after it is determined "YES" in step S107. However, the present invention is not limited thereto. The process of the arithmetic processing section 13 may proceed directly to step S108 if it is determined "YES" in step S107. As a result, a detailed navigation guidance automatically begins when a user reaches the location of change which has been set, whereby the user has no need to further direct his or her attention to the navigation device. Thus, it becomes possible to provide a navigation device allowing the user to further concentrate a driving the vehicle.

Figure 3:
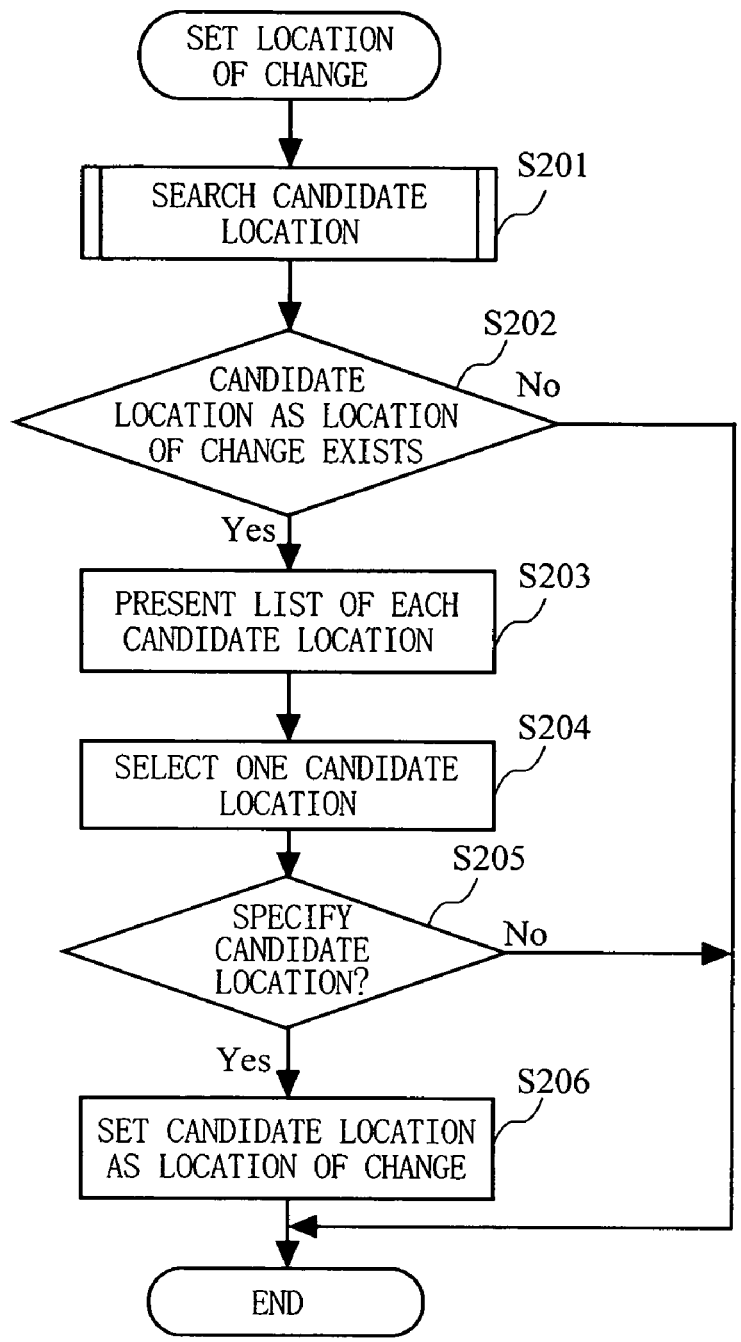
FIG. 3 is a flowchart illustrating a detailed process of step S103 shown in FIG. 2.

Next, referring to a flowchart in FIG. 3, setting a location of change in step S103 shown in FIG. 2 is described.

Firstly, by using the route received in step S102 and the map data stored in the data storage section 14, the arithmetic processing section 13 searches a candidate for a location of change (hereinafter, referred to as "a candidate location") (step S201). the detailed process performed in step S201 is described later.

As a result of performing step S201, if there is no candidate location found ("NO" in step S202), the arithmetic processing section 13 ends the process shown in FIG. 3 without setting any location of change. Here, if it is determined "NO" in step S202, the arithmetic processing section 13 informs the user of the determination by voice. Additionally, according to a designation from the user, the arithmetic processing section 13 may change conditions for searching a target location, and execute a target candidate location search again.

On the other hand, as a result of performing step S201, if there is at least one candidate location found ("YES" in step S202), the arithmetic processing section 13 assigns a priority to each of the candidate locations in a predetermined manner for generating voice data indicating a name of each candidate location, and then sends the voice data to the output section 15 in an order of descending priorities. In accordance with the received voice data, the output section 15 presents each candidate location by outputting a voice such as "∞ (a first candidate location), xx (a second candidate location), . . . " (step S203). It often takes a considerable time to read aloud the name of one or more candidate locations by voice. Thus, through being operated the input section 11 by the user, the arithmetic processing section 13 may accelerate the playback speed of voice or skip a reading-out of the one or more candidate locations. a method of assigning priority is described later. If the navigation device includes a display device, one or more candidate locations may be presented to the user by displaying the name of the one or more candidate locations in the form of a list, according to the priority assigned to each candidate location. Alternatively, the navigation device may present each candidate location by displaying a map image marked, together with the priority, at a position at which the candidate location exists.

By operating the input section 11, the user selects one candidate location from at least one candidate location presented as such. In accordance with the above operation for the input section 11, the arithmetic processing section 13 specifies one location from one or more candidate locations which have been presented (step S204). As a detailed example of step S204, if a candidate location is presented by voice output, the arithmetic processing section 13 may select the candidate location being read aloud when the user operates the input section 11. Alternatively, if one or more candidate locations are being read aloud together with priorities, the user may designate a priority by operating the input section 11, and then the arithmetic processing section 13 may select a candidate location assigned with the designated priority. Still alternatively, the user may input by voice a candidate location into a microphone employed as the input section 11, and then the arithmetic processing section 13 may recognize the inputted voice, and selects the candidate location based on the result. Thus, this is preferable because selecting a candidate location automatically by only voice decreases the frequency at which the user directs his or her attention to the display device.

In step S204, if one or more candidate locations are displayed in the form of a list or on a map, the user may designate one candidate location by operating a remote control employed as the input section 11, and the arithmetic processing section 13 may select the designated candidate location. Alternatively, if one or more candidate locations are displayed with priorities, the user may designate a priority by operating the input section 11, and the arithmetic processing section 13 may select a candidate location assigned with the designated priority. Note that since the user does not necessarily need to select the presented candidate location, the arithmetic processing section 13 preferably ends step S204 when a predetermined time has passed since step S204 begins. Obviously, in this case, the arithmetic processing section 13 selects no candidate location.

As a result of performing step S204 as described above, if no candidate location is selected ("NO" in step S205), the arithmetic processing section 13 ends the process shown in FIG. 3 without setting any location of change in the same manner as determined "NO" in step S202.

On the other hand, after step S204, if a candidate location is selected ("YES" in S205), the arithmetic processing section 13 sets the candidate location selected in step S204 as a location of change (step S206), and ends the process shown in FIG. 3.

In the above setting of a location of change, the arithmetic processing section 13 sets a candidate location designated by the input section 11 as a location of change. However, the present invention is not limited thereto. The arithmetic processing section 13 may automatically set a candidate location assigned with the highest priority as a location of change. Alternatively, by previously receiving the information of locations where a user often visits, the arithmetic processing section 13 may set the locations where the user often visits as locations of change. In order to receive such information, the arithmetic processing section 13 may urge the user to input types of landmarks or facilities which are well-known to the user, or urge to the user to input specific names such as "∞ city hall," "∞ station," or "∞ elementary school," when initializing a system of the navigation device, for example.

Figure 4:
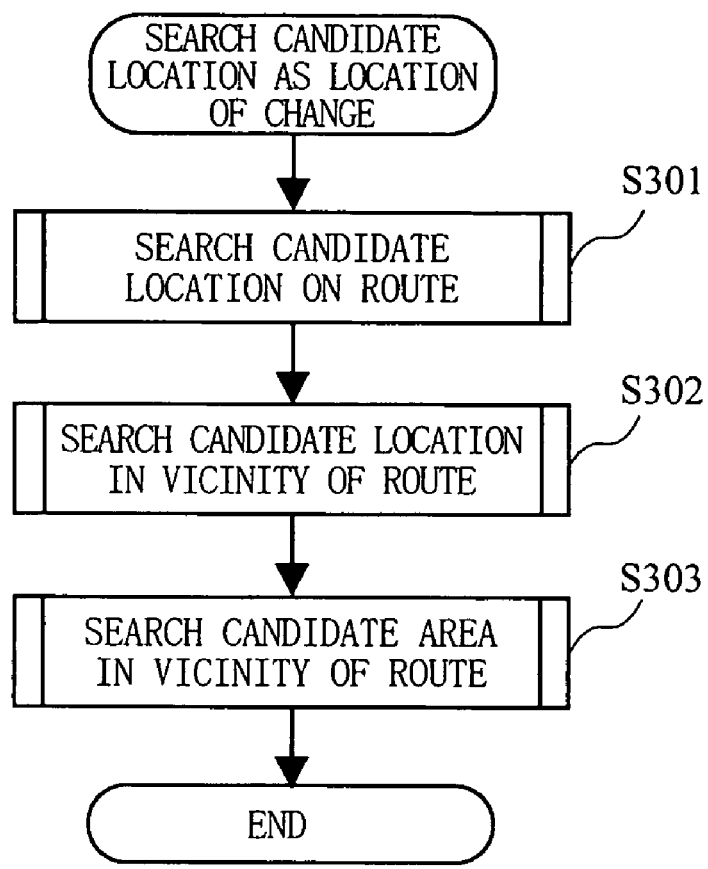
FIG. 4 is a flowchart illustrating a detailed process of step S201 shown in FIG. 3.

Next, referring to a flowchart shown in FIG. 4, a candidate location search of S201 shown in FIG. 3 is described.

Firstly, by using the map data stored in the data storage section 14, the arithmetic processing section 13 searches on the route received in step S102 for a candidate location (a characteristic point) existing on a section having a predetermined distance extending from the current position of the user derived as described above in the direction of the destination designated in step S101 (step S301. The arithmetic processing section 13 assigns the highest priority to the candidate location received thereby.

Next, by using the map data, the arithmetic processing section 13 searches for a candidate location (a facility) existing in the vicinity of the section derived in step S301 (step S302). The arithmetic processing section 13 assigns the second highest priority to the candidate location received thereby.

Then, by using the map data, the arithmetic processing section 13 searches for an area through which the section derived in step S301 passes as a candidate location (step S303). The arithmetic processing section 13 assigns the lowest priority to the location received thereby.

The detailed process performed in steps S301 to S303 is described later.

The priority of a candidate location may be assigned based on positional relationships between all selected candidate locations after steps S301 to S303. For example, the further away from the current position a candidate location is, the higher a priority may be assigned to the candidate location, or the closer from a current position the candidate location is, the higher a priority may be assigned to the candidate location.

The order for steps S301 to S303 is not limited to that as shown in FIG. 4. Steps S301 to S303 may be executed in different orders.

Furthermore, a candidate location may be collectively presented to the user after the end of the process performed in steps S301 to S303, or a candidate location received in each step may be presented to the user at the end of the respective steps S301 to S303.

Referring to FIGS. 5 to 11, an exemplary structure of the map data stored in the data storage section 14 shown in FIG. 1 is described.

The map data represents a relatively wide range of map as exemplified in FIG. 5. More preferably, such a wide range of map is divided into several rectangular regions. The map data is a collection of unit data representing a map divided into rectangular regions (units). As exemplified in FIG. 6, each unit data includes at least a node table, a link table, a facility table, an area table, and a candidate location table.

In the node table, as shown in FIG. 7, a list of latitude and longitude coordinates and a connecting link number are indicated for each node which exists in a target unit, and which is uniquely specified by a node number. The node shows a characteristic point included in the target unit such as an intersection, a curved point and a dead end on the road network. The link shows a street section between two characteristic points. The connecting link is a link connected to the target node.

In the link table, as shown in FIG. 8, a start end node number, a terminal end node number, a link length, and a facility/area number are indicated for each node which exists in the target unit, and which is uniquely specified by the node number.

The start end node number is a node number which specifies a starting point of a target link.

The terminal end node number is a node number which specifies an end point of the target link.

The link length shows an actual distance of the target link.

The facility/area number is a facility number which uniquely specifies a facility existing along the target link, or an area number which uniquely specifies an area containing the target link.

In the facility table, as shown in FIG. 9, a list of latitude and longitude coordinates, which indicate a position of a target facility, category information and a name of the target facility are indicated for each facility which exists in the target unit, and which is uniquely specified by a facility number.

The category information specifies a type of a target facility. As a specific example, if a type of facility is a city hall, U1 is assigned as the category information. If a type of facility is a post office or an elementary school, U2 or U3 is assigned respectively.

In the area table, as shown in FIG. 10, region information, size information and a name of a target area are indicated for each area contained in the target unit and uniquely specified by an area number.

The region information is a list of latitude and longitude coordinates, which specify respective vertexes of a region covered by the target area (a polygon depicted on a map).

The size information is information which specifies an approximate size of the target area. As a specific example, the size information V1 is assigned to a relatively wide area, and the size information V2 is assigned to a relatively narrow area.

Figure 11:
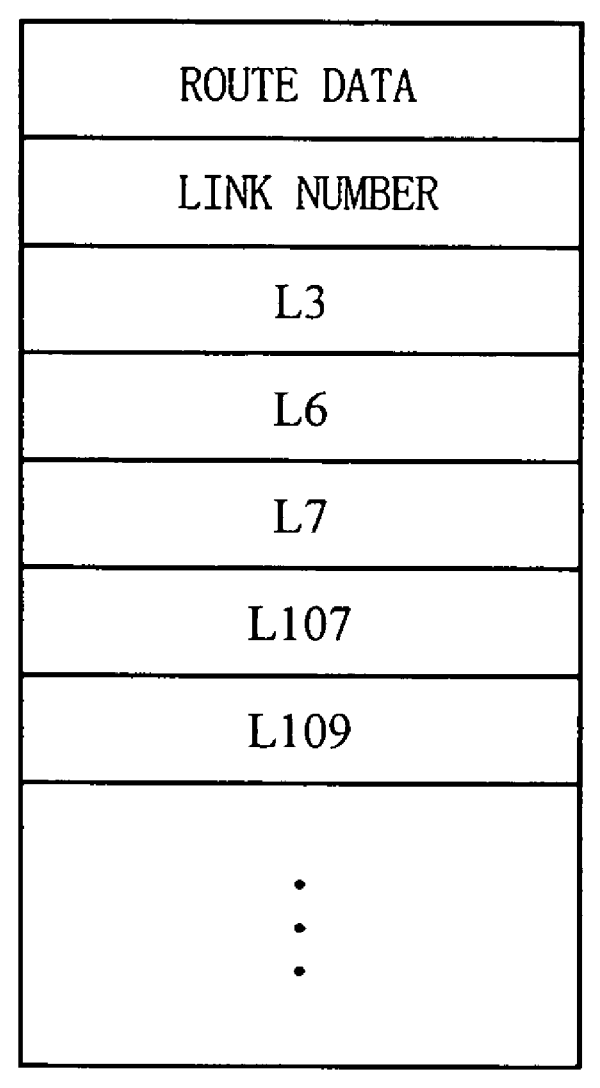

FIG. 11 is a diagram illustrating an exemplary configuration of the route data received in step S102 shown in FIG. 2. In FIG. 11, the route data is represented by a link line. More specifically, the route data includes link numbers which specify all links comprising the route from the user's current position to the destination. A link number is placed in an array according to an order in which the user passes through from the current position to the destination.

Figure 12:
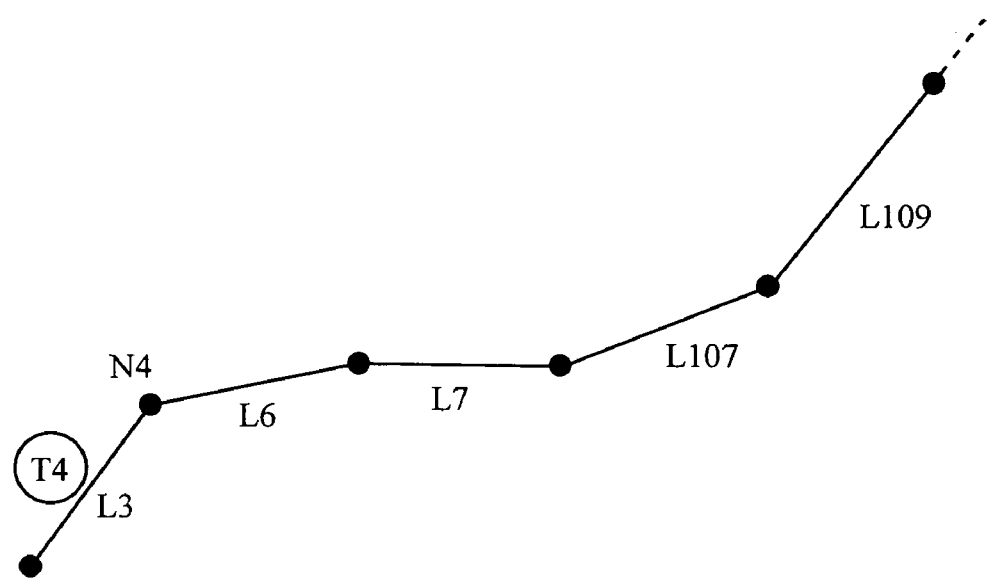
FIG. 12 is a schematic diagram illustrating an example of identifying characteristic points or facilities on a route shown in FIG. 11.

By using the aforementioned map data (see FIGS. 6 to 10) and the route data (see FIG. 11), the arithmetic processing section 13 searches, in step S201 shown in FIG. 3, for a candidate location (a characteristic point, a facility, or an area), which exists on the route or in the vicinity of the route, and satisfies the predetermined condition. Here, it is assumed, for example, that a partial route specified by the route data shown in FIG. 11 is represented by an image as shown in FIG. 12. In FIG. 12, the arithmetic processing section 13 specifies from the route data that a link assigned with L3 as a link number is a first link the user passes.

Next, by accessing the link table shown in FIG. 8, the arithmetic processing section 13 recognizes, for example, that a node N4 on a link denoted by a link number L3, or a facility denoted by a facility number T4 exists in the vicinity of the link denoted by the link number L3.

Then, by accessing the node table shown in FIG. 7, the arithmetic processing section 13 recognizes a latitude coordinate and a longitude coordinate, which indicate a position of an intersection denoted by a node number N2, and a name specified as ▲▲ intersection.

Furthermore, by accessing the facility table shown in FIG. 9, the arithmetic processing section 13 recognizes a latitude coordinate and a longitude coordinate, which indicate a location of a facility denoted by a facility number T4, and a name specified as ΔΔ elementary school.

Next, referring to FIGS. 13 to 18, a process performed from S301 to S303 shown in FIG. 4 is specifically described.

Figure 13:
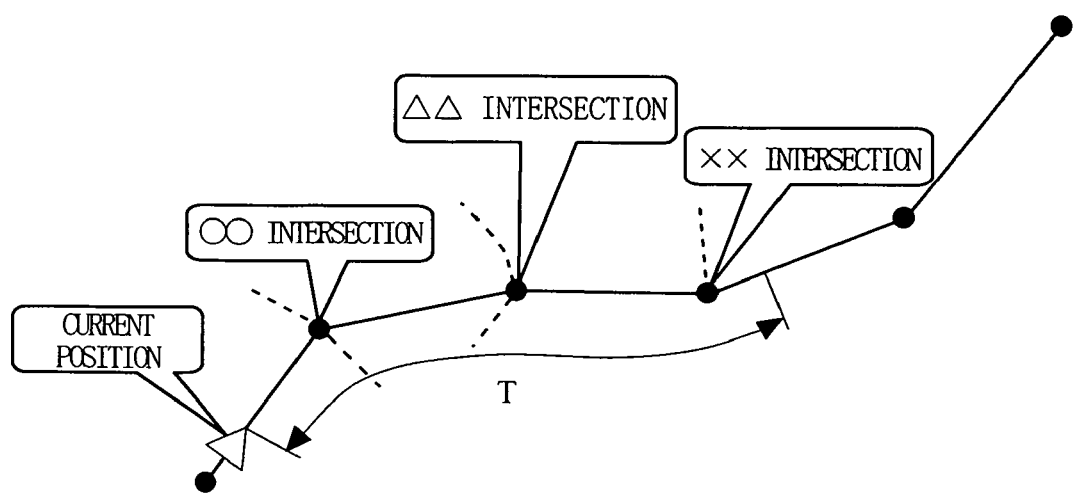
FIG. 13 is a schematic diagram illustrating an exemplary name of intersections searched on the route shown in FIG. 11.

In step S301, as shown in FIG. 13, the arithmetic processing section 13 selects, on the route represented by the route data, names of intersections existing within a section having a predetermined distance T (e.g., T is 1000 meters) extending from a current position derived from the arithmetic processing section 13.

Figure 14:
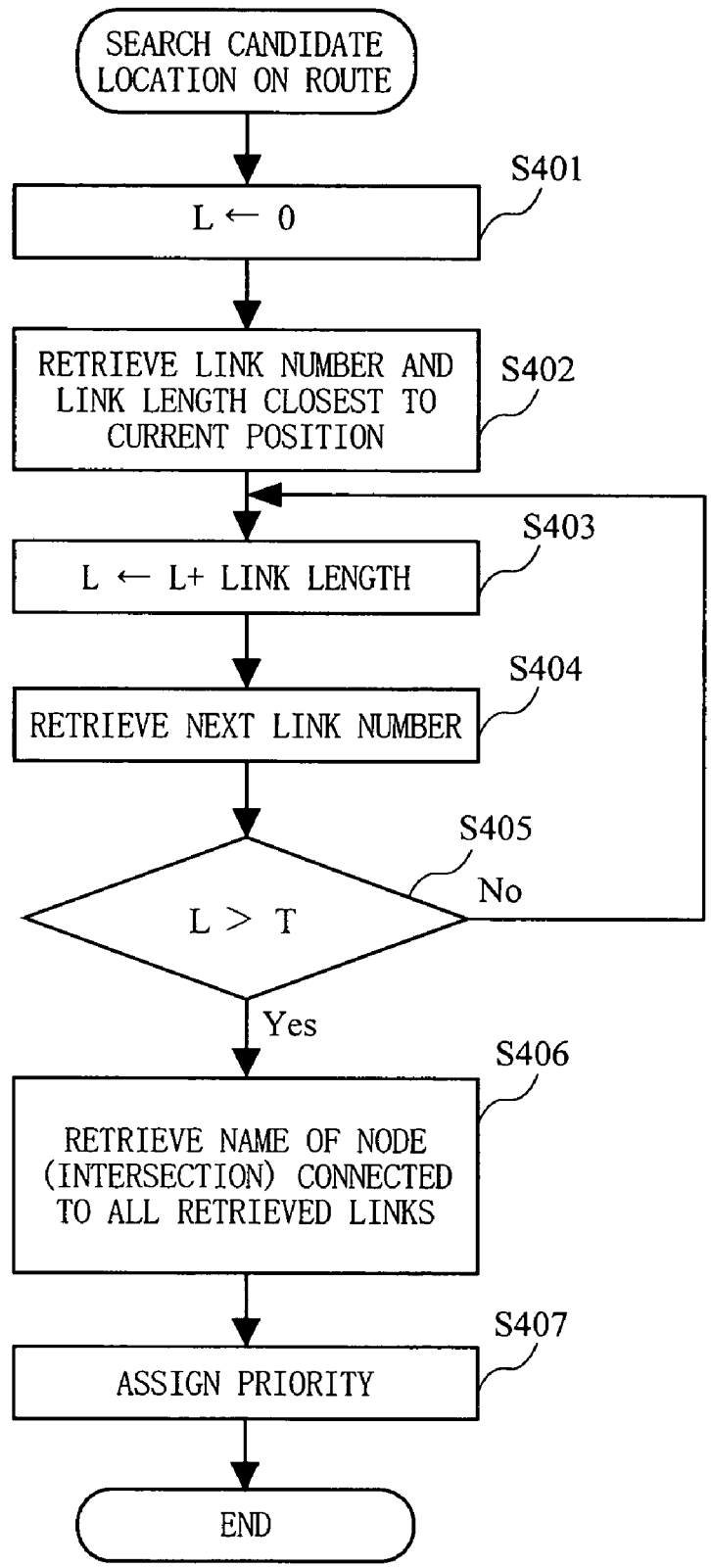
FIG. 14 is a flowchart illustrating a detailed procedure of step S301 shown in FIG. 4.

FIG. 14 is a flowchart illustrating a detailed procedure of step S301 shown in FIG. 4.

Firstly, the arithmetic processing section 13 initializes a variable L, to 0, used for calculating a distance from the current position to a terminal end of the currently selected link (step S401).

Next, by accessing the link table, the arithmetic processing section 13 retrieves a link number and a link length which are both assigned to a link closest to the current position (hereinafter, referred to as a target link) (step S402).

Then, the arithmetic processing section 13 adds the target link length retrieved in step S402 to the variable L (step S403).

Next, the arithmetic processing section 13 selects from the route data a link indicated after the link closest to the current position as a new target link, and retrieves its link number (step S404).

The arithmetic processing section 13 repeats the process performed in steps S403 to S404 until the variable L exceeds the predetermined distance T (step S405).

By such a process, the arithmetic processing section 13 can retrieve the link number of a link included within the section having the predetermined distance extending from the current position.

Then, by accessing the node table, the arithmetic processing section 13 retrieves all names of intersections assigned to a node, which are connected to a link specified by the currently retrieved number (step S406).

Furthermore, the arithmetic processing section 13 assigns a priority to each of the currently retrieved names of intersections in accordance with any of the methods described above (step S407).

Figure 15:
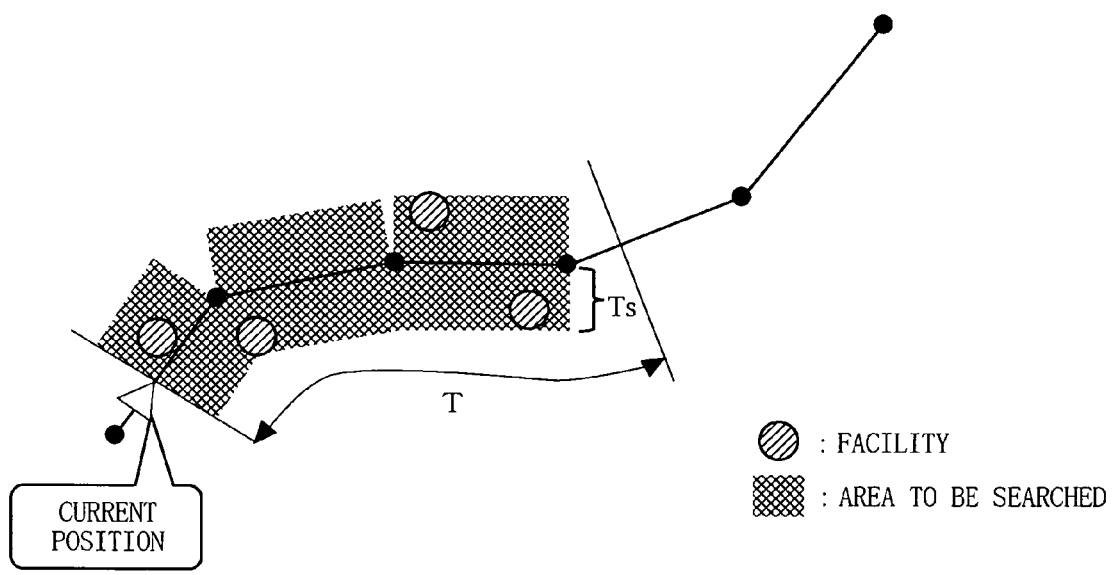
FIG. 15 is a schematic diagram illustrating exemplary names of facilities searched in the vicinity of the route shown in FIG. 11.

In step S302, as shown in FIG. 15, the arithmetic processing section 13 selects, on the route represented by the route data, a facility existing within a region, in the vicinity along a section having a predetermined distance T (e.g., T is 1000 meters) starting from the current position, extending perpendicularly by a distance Ts from both sides of the section.

Figure 16:
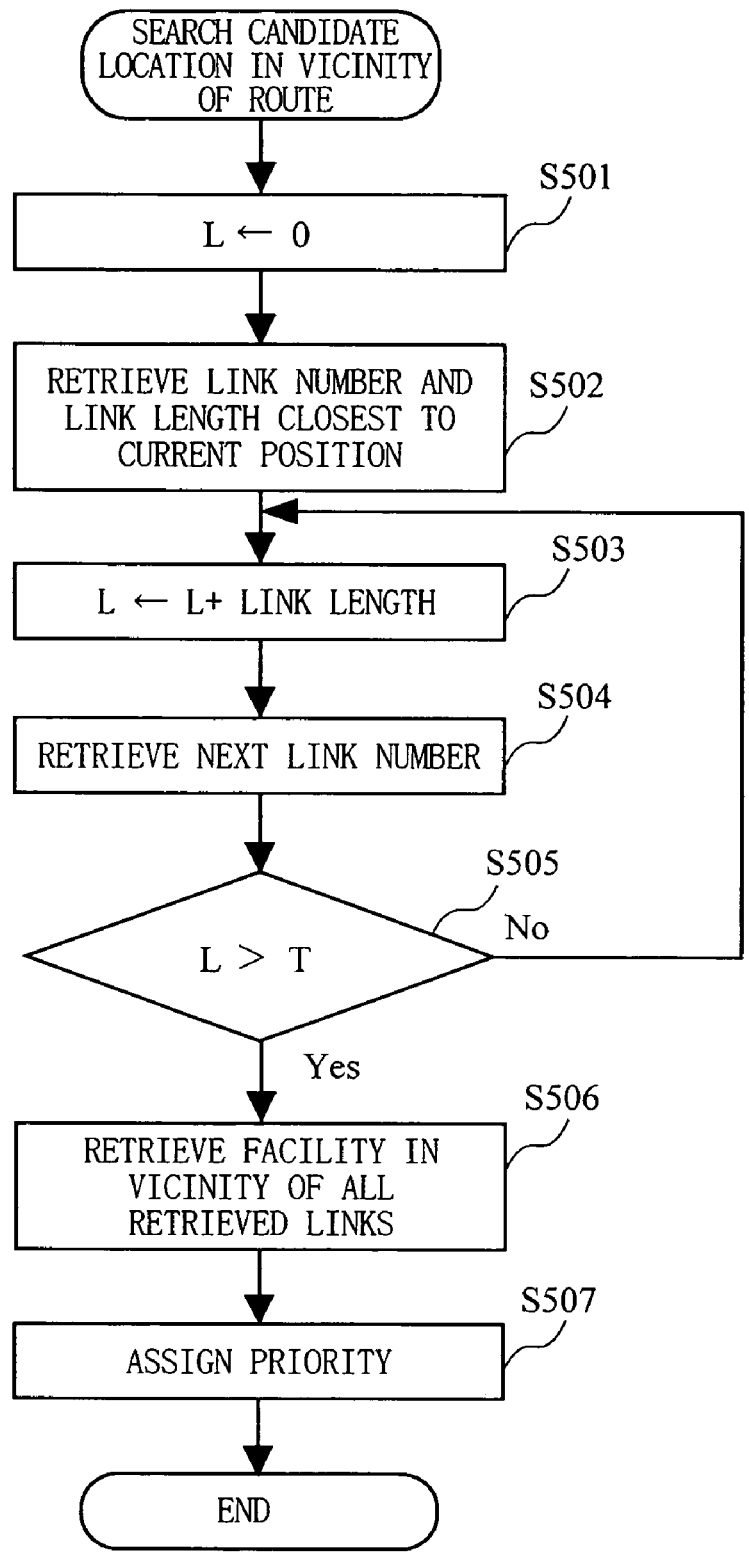

FIG. 16 is a flowchart illustrating a detailed procedure of step S302 shown in FIG. 4.

Initially, the arithmetic processing section 13 performs the same process as that of steps S401 to S405, and retrieves a link number of a link contained in a section having the predetermined distance T from the current position (S501 to S505).

Next, by accessing the facility table, the arithmetic processing section 13 retrieves all names of facilities existing within a region in the vicinity along a link, specified by the currently retrieved number, extending perpendicularly by the distance Ts from both sides of the link (step S506). Specifically, coordinate positions of partial routes comprising the currently retrieved link are specified based on positions of start end nodes and terminal end nodes on the link.

Since a coordinate position of each facility is recorded in the facility table, the facilities within the region having Ts extending from the link are specified based on the coordinate positions.

According to the above process, a facility, existing within rectangular regions which are line symmetrical with each other along a link existing therebetween, is selected. Depending on a curve between the currently retrieved links, overlapped selection of a same facility may occur. Thus, a process causing such an overlapped selection of the same facility needs to be avoided.

Next, the arithmetic processing section 13 assigns a priority to each of the currently retrieved names of the facilities in accordance with any of the methods described above (step S507).

Figure 17:
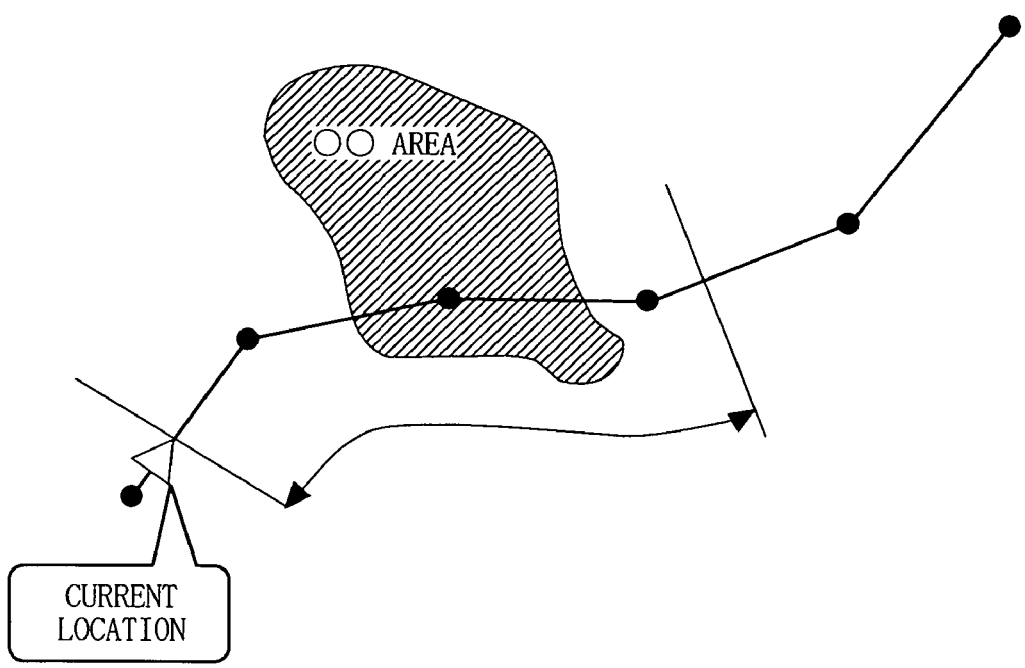
FIG. 17 is a schematic diagram illustrating exemplary names of areas searched in the vicinity of the route shown in FIG. 11.

In step S303, as shown in FIG. 17, the arithmetic processing section 13 selects, on the route represented by the route data, an area through which a section, having the predetermined distance T (e.g., T is 1000 meters) extending from the current position derived from arithmetic processing section 13, passes.

Figure 18:
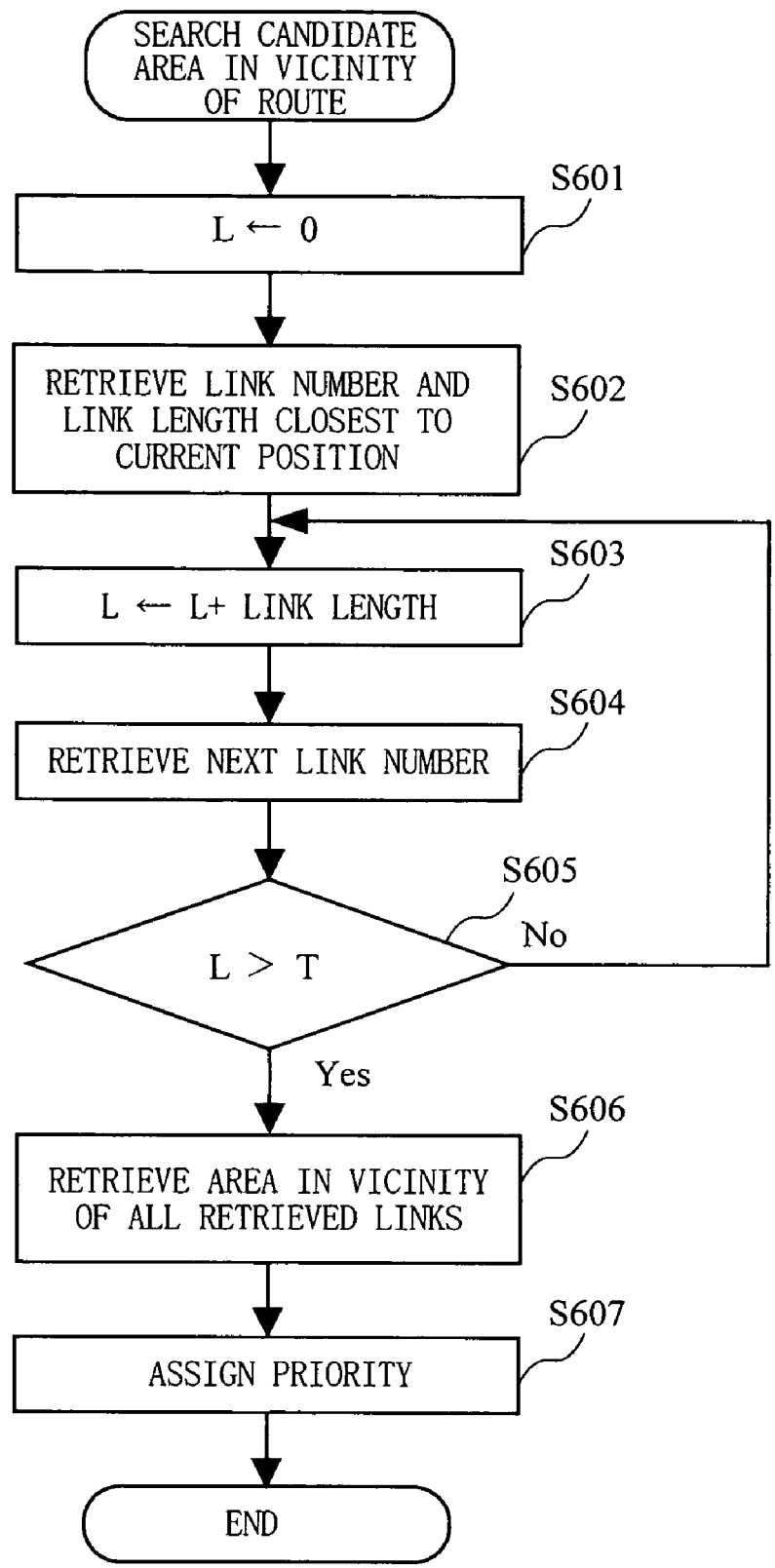
FIG. 18 is a flowchart illustrating a detailed procedure of step S303 shown in FIG. 4.

FIG. 18 is a flowchart illustrating a detailed procedure of step S303 shown in FIG. 4.

Initially, the arithmetic processing section 13 performs the same process as that of steps S401 to S405, and retrieves a link number contained in the section separated from the current position by the predetermined distance T (steps S601 to S605).

Next, by accessing to the area table, the arithmetic processing section 13 retrieves all names of the areas through which partial routes, comprising all links specified by the currently retrieved number, pass (step S606). Specifically, as described above, coordinate positions of the partial routes are specified as described above. In the area table, since a coordinate position of respective vertexes of the target area is recorded in the area table, it is possible to specify the areas through which the partial route passes.

Similarly to the case of facilities, the arithmetic processing section 13 performs a process so as not to select an area in an overlapped manner.

The arithmetic processing section 13 assigns a priority to each of the currently retrieved names of the areas in accordance with any of the methods described above (step S607).

In practice, if all facilities indicated in the facility table and all areas indicated in the area table are allowed to be presented as candidate locations in step S203 shown in FIG. 3, a heavy load is imposed on the arithmetic processing section 13. Therefore, for limiting facilities or areas to be presented to a user as a candidate location, the candidate location table preferably indicates, as exemplified in FIG. 19, the category information and the size information. In the present embodiment, a facility corresponding to a type specified by the category information, and an area of size specified by the size information, are both indicated in the candidate location table.

Although the above description illustrates an example where the navigation device is mounted on a vehicle, the present invention is not limited thereto. The navigation device may be used for a pedestrian.

Furthermore, in the above description, the arithmetic processing section 13 performs the aforementioned process in accordance with a computer program which is previously stored. However, the present invention is not limited thereto. The aforementioned process may be realized with hardware. Furthermore, the computer program may be distributed in a recorded state in a storage medium such as CD-ROM. Still furthermore, the computer program may be stored in a server device connected to a network such that a terminal device can be downloaded through the network.

A navigation device according to the present invention is useful for on-vehicle use or portable use, the device capable of decreasing the frequency at which a user directs his or her attention to the navigation device.

The invention claimed is:
1. A navigation device comprising:
a data storage unit for storing map data;
a destination designating unit for designating a destination;

a position deriving unit for deriving a current position of a user;

a route receiving unit for receiving route data, the route data representing a route, from the current position derived by the position deriving unit, to the destination designated by the destination designating unit, and the route data being obtained according to the map data stored in the data storage unit;

a data selecting unit for selecting candidate location data, the candidate location data indicating at least one location existing on the route represented by the route data or in a vicinity of the route and satisfying a predetermined condition, the candidate location data being selected based on the route data received by the route receiving unit and the map data stored in the data storage unit;

a location-change designating unit for designating a location of change at which a method of guidance is to be changed, the location of change being designated based on the candidate location data selected by the data selecting unit;

a determination unit for determining whether or not the user has reached the location of change based on the current position derived by the position deriving unit and the location of change designated by the location-change designating unit; and a navigation guidance unit for (i) guiding the user to the destination using detailed instructions associated with a method of guidance designated when the determination unit determines that the user has arrived at the location of change, and (ii) performing no process of navigation guidance while the determination unit determines that the user has not arrived at the location of change, wherein the location-change designating unit includes:

a priority assigning unit for assigning a priority to the location indicated by the candidate location data selected by the data selecting unit;

an output unit for outputting the location indicated by the candidate location data selected by the data selecting unit in accordance with the priority assigned by the priority assigning unit; and a location-change selecting unit for selecting one location of change based on a designation from the user.

2. The navigation device according to claim 1, wherein the data selecting unit selects, on the route represented by the route data, candidate location data indicating at least one location existing within a range having a predetermined distance, the range extending from the current position derived by the position deriving unit in the direction of the destination designated by the destination designating unit.

3. The navigation device according to claim 1, wherein the navigation guidance unit guides the user to the destination by voice.

4. The navigation device according to claim 1, wherein the data selecting unit selects the candidate location data immediately after the route receiving unit generates the route data.

5. The navigation device according to claim 1, wherein when the determination unit determines that the user has arrived at the location of change, the navigation guidance unit automatically changes the method of guidance to a detailed method using detailed instructions.

6. The navigation device according to claim 1, wherein the navigation guidance unit guides the user to the destination by voice.

7. A guiding method executed by a navigation device, the guiding method comprising:

designating a destination;
deriving a current position of a user;

receiving route data, the route data representing a route, from the current position derived by the deriving of the current position, to the destination designated by the designating of the destination, and the route data being obtained according to map data stored in the navigation device;

selecting candidate location data, the candidate location data indicating at least one location existing on the route represented by the route data or in a vicinity of the route and satisfying a predetermined condition, the condition location data being selected based on the route data received by the receiving of the route data and the map data stored in the navigation device;

designating a location of change at which a method of guidance is to be changed, the location of change being designated based on the candidate location data selected by the selecting of the candidate location data;

determining whether or not the user has reached the location of change based on the current position derived by the deriving of the current position and the location of change designated by designating of the location of change; and guiding the user to the destination using detailed instructions associated with a method of guidance designated when the determining of whether or not the user has reached the location of change determines that the user has arrived at the location of change, and performing no process of navigation guidance while the determining of whether or not the user has reached the location of change determines that the user has not arrived at the location of change, wherein the determining of whether or not the user has reached the location of change includes:

assigning a priority to the location indicated by the candidate location data selected by the selecting of the candidate location data;

outputting a location indicated by the candidate location data selected by the selecting of the candidate location data in accordance with the priority assigned by the assigning of the priority; and selecting one location of change based on a designation from the user.

8. A computer-readable storage medium having a computer program stored thereon, the computer program to be executed by a navigation device for guiding a user to a destination, the computer program causing the navigation device to execute a method comprising:

designating a destination;
deriving a current position of a user;
receiving route data, the route data representing a route, from the current position derived by the deriving of the current position, to the destination designated by the designating of the destination, and the route data being obtained according to map data stored in the navigation device;

selecting location data, the candidate location data indicating at least one location existing on the route represented by the route data or in a vicinity of the route and satisfying a predetermined condition, the candidate location data being selected based on the route data received by the receiving of the route and the map data stored in the navigation device;

designating a location of change at which a method of guidance is to be changed, the location of change being designated based on the candidate location data selected by selecting of the candidate location data;

determining whether or not the user has reached the location of change based on the current position derived by the deriving of the current position and the location of change designated by the designating of the location of change; and guiding the user to the destination using detailed instructions associated with a method of guidance designated when the determining of whether or not the user has reached the location of change determines that the user has arrived at the location of change, and performing no process of navigation guidance while the determining of whether or not the user has reached the location of change determines that the user has not arrived at the location of change, wherein the determining of whether or not the user has reached the location of change includes:

assigning a priority to the location indicated by the candidate location data selected by the selecting of the candidate location data;

outputting a location indicated by the candidate location data selected by the selecting of the candidate location data in accordance with the priority assigned by the assigning of the priority; and selecting one location of change based on a designation from the user.

\* \* \* \* \*